US010034209B1

(12) United States Patent
Nandan et al.

(10) Patent No.: US 10,034,209 B1
(45) Date of Patent: Jul. 24, 2018

(54) TRAFFIC OFFLOADING FOR A COMMUNICATION DRONE

(71) Applicant: QUALCOMM Incorporated, San Diego, CA (US)

(72) Inventors: Amar Kumar Nandan, Hyderabad (IN); Abhigyan Joshi, Hyderabad (IN); Kihak Yi, Hyderabad (IN); Appala Naga Raju Bodduru, Hyderabad (IN); Nitin Mehrotra, Bangalore (IN); Venkata A Naidu Babbadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/455,679

(22) Filed: Mar. 10, 2017

(51) Int. Cl.
*H04W 36/08* (2009.01)
*H04W 36/30* (2009.01)
(Continued)

(52) U.S. Cl.
CPC .......... *H04W 36/08* (2013.01); *B64C 39/024* (2013.01); *H04W 36/0061* (2013.01);
(Continued)

(58) Field of Classification Search
CPC ............ B64C 2201/122; B64C 39/024; G05D 1/0022; G05D 1/0027; G05D 1/0202; G08G 5/0013; G08G 5/0043; H04L 5/005; H04L 61/2007; H04W 36/0055; H04W 72/0413; H04W 72/042; H04W 84/06; H04W 88/02
See application file for complete search history.

(56) References Cited

U.S. PATENT DOCUMENTS 9,346,544 B2   5/2016   Kugelmass
9,363,008 B2   6/2016   Boss et al.
(Continued)

FOREIGN PATENT DOCUMENTS

WO       2016012437 A1    1/2016

*Primary Examiner* — Thai Vu
(74) *Attorney, Agent, or Firm* — The Marbury Law Group, PLLC

(57) ABSTRACT

Various embodiments include methods of offloading user equipment communication traffic between communications drones. The methods may include receiving, at a candidate communication drone, a replacement request from a requesting communication drone. Radio frequency (RF) communication parameters may be set for the candidate communication drone to take over communications of the requesting communication drone. The RF communication parameters may be determined based on the replacement request and may distinguish the candidate communication drone from the requesting communication drone and at least one neighboring communication drone. The candidate communication drone may move toward a target position adjacent a position of the requesting communication drone without radiating RF communications for taking over communications of the requesting communication drone. In addition, the candidate communication drone may radiate RF communications using the set RF communication parameters to begin taking over communication services from the requesting communication drone upon arriving at the target position.

28 Claims, 6 Drawing Sheets

(51) Int. Cl.
*H04W 36/00* (2009.01)
*B64C 39/02* (2006.01)

(52) U.S. Cl.
CPC ....... *H04W 36/30* (2013.01); *B64C 2201/024* (2013.01); *B64C 2201/108* (2013.01); *B64C 2201/122* (2013.01)

(56) References Cited

U.S. PATENT DOCUMENTS

| | | |
|---|---|---|
| 9,386,605 B2 | 7/2016 | Reitsma et al. |
| 2015/0356482 A1 | 12/2015 | Whipple et al. |
| 2017/0163073 A1* | 6/2017 | Neander ................ H02J 7/025 |
| 2017/0208512 A1* | 7/2017 | Aydin ............... H04W 36/0055 |
| 2017/0242431 A1* | 8/2017 | Dowlatkhah ........ G05D 1/0027 |

* cited by examiner

TRAFFIC OFFLOADING FOR A COMMUNICATION DRONE

BACKGROUND

A collection of communications drones (i.e., Cell on Drone—CoD), such as Femto cell communications drones, may be used to provide elements of a communication network. CoDs may be quickly deployed, which makes them useful for creating an ad hoc communication network. Networks generally have quality of service (QoS) and/or quality of experience (QoE) requirements that must be maintained continuously. However, the use of CoDs has operational limitations. A need for a communication network to be continuously maintained may conflict with drone onboard power limitations. For battery powered drones, there is a tradeoff between the amount of energy expended during flight and the transmission power used by the communication drone; extending flight time may require reducing the transmission power. Thus, a network of CoDs will require periodic replacements of individual drones to enable recharging, which raises the need to find and substitute in replacement CoDs.

When replacing a CoD drone, the offloading or handoff of communications to the replacement communication drone may unintentionally interfere with wireless communications of neighboring CoDs. If a user equipment (UE) using a CoD-provided communications network receives communications from two communications drones with the same physical cell identity (PCI), a PCI confusion or PCI collision can occur. A collision can occur when a UE is within range of two cells that each has the same PCI assigned and are simultaneously broadcasting to the UE. Confusion may occur when the UE is within range of two cells that each have the same PCI and the UE cannot distinguish between the two cells. Such confusions or collisions can render the UE unable to identify the cell correctly. Confusion can cause handover procedures from one cell to another cell to fail. The larger the number of small cells (e.g., micro, pico, or femto cells), the greater this problem becomes.

SUMMARY

Various embodiments include methods of offloading UE communication traffic between communications drones. Various embodiments may include receiving, at a candidate communication drone, a replacement request from a requesting communication drone. The replacement request may include identification information of the requesting communication drone. The replacement request may also include identification information of at least one communication drone neighboring the requesting communication drone ("at least one neighboring communication drone"). Various embodiments may further include setting radio frequency (RF) communication parameters for the candidate communication drone to take over communications of the requesting communication drone. The RF communication parameters may be determined based on the replacement request and the RF communication parameters may distinguish the candidate communication drone from the requesting communication drone and the at least one neighboring communication drone. Various embodiments may further include moving the candidate communication drone toward a target position adjacent a position of the requesting communication drone, without radiating RF communications on frequencies used for the UE communication traffic, for taking over communications of the requesting communication drone. Various embodiments may further include the candidate communication drone radiating RF communications on one or more of the frequencies used for the user equipment communication traffic, using the set RF communication parameters to begin taking over communication services from the requesting communication drone upon arriving at the target position.

In some embodiments, the candidate communication drone may receive a status request from the requesting communication drone and transmit, to the requesting communication drone, status information in response to the status request. In such embodiments, transmitting, from the candidate communication drone to the requesting communication drone, status information in response to the status request may include transmitting one or more of an indication of a current communication state, battery status, available power level, flight time remaining, position, altitude, heading, speed, and current activities of the candidate communication drone.

Some embodiments may further include transmitting by the candidate communication drone an arrival indication upon arriving at the target position. In some embodiments, radiating RF communications using the set RF communication parameters to begin taking over communication services from the requesting communication drone upon arriving at the target position may be performed after transmitting the arrival indication. The RF communication parameters may distinguish the candidate communication drone from the requesting communication drone and the at least one neighboring communication drone by using a collision-free physical cell identity.

Various embodiments may include transmitting, from a requesting communication drone, a status request to one or more candidate communication drones, receiving responses to the status request by the requesting communication drone in which received responses may include status information from responding candidate communication drones, selecting a candidate communication drone for replacement of the requesting communication drone from among the responding candidate communication drones based on received responses to the status request. The status information from each candidate communication drone may include, for example, one or more or a combination of an indication of a current communication state (e.g., whether the drone is currently serving traffic), battery status, available power levels or flight time remaining, position, altitude, heading and speed, and current activities of the candidate communication drone. The requesting communication drone may transmit to the selected candidate communication drone a replacement request that may include identification information of the requesting communication drone and the at least one communication drone neighboring the requesting communication drone ("at least one neighboring communication drone").

Some embodiments may include determining RF communication parameters for the selected candidate communication drone that will distinguish the selected candidate communication drone from the requesting communication drone and the at least one neighboring communication drone, and including the determined RF communication parameters within the transmitted replacement request. Some embodiments may include determining whether the selected candidate communication drone has arrived at a target position adjacent to the requesting communication drone, and performing a handover procedure to enable the selected candidate communication drone to take over handling communicating traffic from the requesting communication drone in response to determining that the selected candidate communication drone has arrived at the target position. In some embodiments, performing the handover procedure may include transmitting a handover message to UE communicating with a network through the requesting communication drone in which the handover message may force the UE to start communicating with the network through the selected candidate communication drone. In some embodiments, performing the handover procedure may include moving the requesting communication drone away from the selected candidate communication drone, thereby decreasing signal strengths of communications from the requesting communication drone received at the UE. In some embodiments, performing the handover procedure may include decreasing signal strength of communications transmitted by the requesting communication drone to the UE.

Further embodiments include a drone having a wireless communication cell (e.g., a Femto cell) and a processor configured with processor-executable instructions to perform operations of the methods summarized above. Further embodiments include a drone having means for performing functions of the methods summarized above. Further embodiments include a non-transitory processor-readable storage medium having stored thereon processor-executable instructions configured to cause a processor to perform operations of the methods summarized above.

BRIEF DESCRIPTION OF THE DRAWINGS

The accompanying drawings, which are incorporated herein and constitute part of this specification, illustrate exemplary embodiments of the claims, and together with the general description and the detailed description given herein, serve to explain the features of the claims.

DETAILED DESCRIPTION

Figure 1:
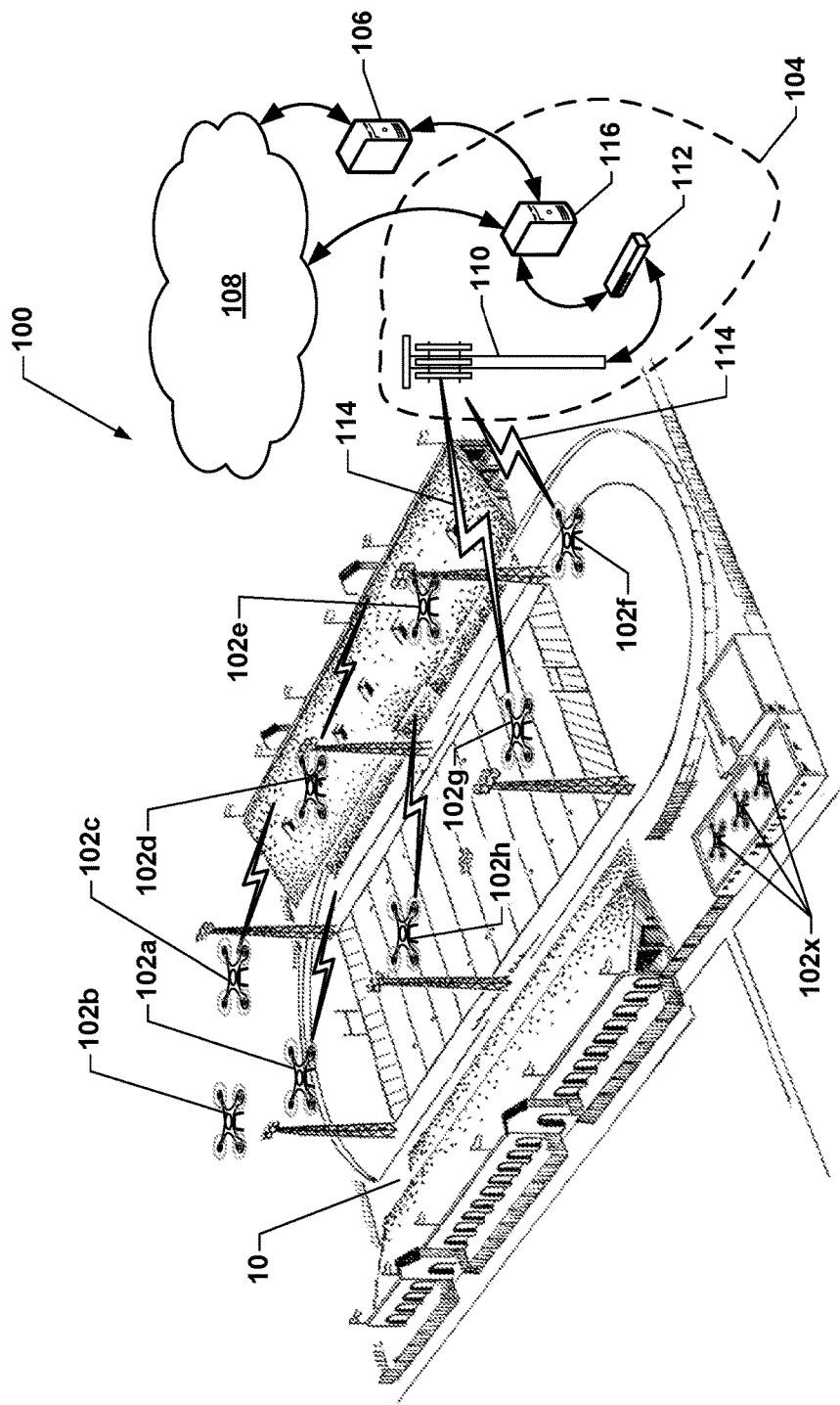
FIG. 1 is a system block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments enable one communication drone to be replaced by another communication drone (i.e., a replacement) in a manner that provides continuity of communication services. A candidate communication drone may receive a replacement request from a requesting communication drone that is on station and requiring replacement in the network (e.g., due to a low battery state). Such a replacement request may include identification information of the requesting communication drone. The replacement request may also include identification information of at least one neighboring communication drone to the requesting communication drone. In response, the candidate communication drone may use information in the replacement request to set radio frequency (RF) communication parameters to take over communications from the requesting communication drone. The RF communication parameters may be set to distinguish the candidate communication drone from the requesting communication drone and the at least one neighboring communication drone. One candidate communication drone may be selected to replace the requesting communication drone. For ease of description, the selected candidate communication drone may be referred to as a replacement communication drone after the selection has been completed. The replacement communication drone may fly toward a target position adjacent to the position of the requesting communication drone, without radiating RF communications on frequencies used for the UE communication traffic. For example, the frequencies used for the UE communication traffic may include frequencies of the communication services monitored or used by the UE. During transit, the replacement communication drone may continue communicating via other RF communication frequencies used for administrative purposes, such as for communications with a controller, server, a control center, or the like for control, navigational, and overall coordination of the various communication drones. Upon arriving at the target position, the replacement communication drone may begin radiating RF communications on frequencies used for the UE communication traffic using the set RF communication parameters to begin taking over communication services from the requesting communication drone. As used herein, the expression, "radiating RF communications," refers to the production and emission of RF signals. Communication services may be taken over from the requesting communication drone using standard handover communication protocols. Various embodiments may also include selecting the replacement communication drone from a number of candidate communication drones, and performing the handover procedures, which may involve reducing transmit power and/or moving the requesting communication drone away from the replacement communication drone.

As used herein, the term "drone" refers to one of various types of autonomous or semi-autonomous vehicles (e.g., aircraft, land vehicles, waterborne vehicles, or a combination thereof) that may operate without onboard human pilots/drivers. A communication drone may include an onboard computing device configured to fly and/or operate the communication drone without remote operating instructions (i.e., autonomously), such as from a human operator or remote computing device. Alternatively or additionally, the computing device onboard the communication drone may be configured to receive operating instructions and/or updates to instructions from a remote computing device via communications in accordance with various embodiments. A communication drone may be propelled for flight and/or other movement in any of a number of known ways. For example, a plurality of propulsion units, each including one or more rotors, may provide propulsion or lifting forces for the communication drone and any payload carried by the communication drone. Further, the communication drone may be powered by one or more types of power source, such as electrical, chemical, electro-chemical, or other power reserve, which may power the propulsion units, the onboard computing device, and/or other onboard components.

As used herein, the term "communication drone" refers to a drone equipped with a cellular RF communication capability configured to provide a wireless network access point for a wireless wide area network (WWAN) or a wireless local area network (WLAN). As an example, a communication drone may serve as a flying base station for a cellular telephony network. As another example, a communication drone may serve as a "cell on drone" or wireless access point for a Wi-Fi network. A communication drone requesting replacement is referred to herein as a "requesting communication drone." A replacement request may be transmitted to one or more other communication drones. One or more other communication drones are referred to herein as "candidate communication drones." A candidate communication drone selected to replace the requesting communication drone is referred to herein as a "replacement communication drone."

The term "computing device" is used herein to refer to an electronic device equipped with at least a processor. Examples of computing devices may include a drone mission controller, mission management computers, a drone operations controller, mobile computing devices (e.g., cellular telephones, wearable devices, smart-phones, web-pads, tablet computers, Internet enabled cellular telephones, Wi-Fi® enabled electronic devices, personal data assistants (PDAs), laptop computers, etc.), personal computers, and server computing devices. In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® or Bluetooth transceiver, etc.).

The terms "user equipment" and "UE" are used herein interchangeably to refer to mobile computing devices using communication services provided by a communication drone. Non-limiting examples of user equipment include cellular telephones, smart-phones, web-pads, tablet computers, Internet enabled cellular telephones, wireless local area network (WLAN) enabled electronic devices, laptop computers, mobile personal computers, smart apparel, vehicle (e.g., aircraft, train, bus, motorcycle, truck, automobile, etc.) computer systems, and similar mobile electronic devices equipped with at least a processor and configured to communicate using wireless communication technologies, including wireless local area network (WLAN) technologies (e.g., Wi-Fi) and/or wireless wide-area network (WWAN) technologies (e.g., 3G, 4G, 5G, Long Term Evolution (LTE), Global Standard for Mobile (GSM), etc.).

The term "server" as used herein refers to any computing device capable of functioning as a server, such as a master exchange server, web server, and a personal or mobile computing device configured with software to execute server functions (e.g., a "light server"). A server may be a dedicated computing device or a computing device including a server module (e.g., running an application that may cause the computing device to operate as a server). A server module (or server application) may be a full function server module, or a light or secondary server module (e.g., light or secondary server application). An example of server suitable for use with the various embodiments is described with reference to FIG. 4.

The term "status information" is used herein to refer to one or more of a variety of types of information about the operating state and status of a communication drone that may be communicated and used for evaluating the availability and suitability of candidate communication drones in various embodiments. Non-limiting examples of status information may include an indication of a current communication state (e.g., whether the drone is currently serving traffic), battery status, available power levels or flight time remaining, position, altitude, heading and speed, current activities of the candidate communication drone and various combinations of two or more such types of information.

Various embodiments may be implemented within a variety of communication systems 100, an example of which is illustrated in FIG. 1. With reference to FIG. 1, the communication system 100 may include a communication network 104 and one or more network servers 106. The communication network 104 and/or the one or more network servers 106 may be coupled to the Internet 108. In some embodiments, the network server 106 may be implemented as a server within the network infrastructure of the communication network 104. The communication system 100 may also include a plurality of communication drones 102a-102h hovering over an environment, such as a stadium 10, to provide localized connectivity to a wireless communications network. In addition, one or more standby communication drones 102x may be parked nearby ready for deployment. The communication drones 102a-h and 102x may be regularly deployed over the environment or specifically deployed as an ad-hoc network for an event, such as to supplement communications during events at the stadium 10.

The communication network 104 may include one or more base stations 110 coupled to a network operations center 112, which operates to connect voice and data communications between mobile computing devices (e.g., tablets, laptops, cellular phones, etc.) and other network destinations, such as via telephone land lines (e.g., a plain ordinary telephone system (POTS) network, not shown) and the Internet 108. The communication network 104 may also include one or more servers 116 coupled to or within the network operations center 112 that provide a connection to the Internet 108 and/or to the network servers 106. Communications between the communications drones 102a-102h and 102x and the communication network 104 may be accomplished via two-way wireless communication links 114. The communication drones 102a-102h and 102x may include wireless transceiver and router capabilities configured to act as small cells or wireless access points, which may include microcells, femtocells, picocells, Wi-Fi access points, and/or other types of wireless network access points. Typically, the range of a microcell is less than two kilometers wide, a picocell is 200 meters or less, and a femtocell is on the order of 10 meters. In contrast, the range of a standard long-range cellular base station (e.g., 110) may be up to 35 kilometers (22 mi). The communication drones 102a-102h and 102x may be the same and/or different from one another.

The one or more base stations 110 may include a computing device configured to provide wireless communications over the small cells or wireless access points, as well as a wide area (e.g., macro cells), which may include Global System for Mobile (GSM), Universal Mobile Telecommunications System (UMTS), GSM/EDGE, fourth generation (4G), third generation (3G), code division multiple access (CDMA), time division multiple access (TDMA), long term evolution (LTE), and/or other communication protocols and technologies. The communication network 104 may in turn provide access to other base stations 110 over the same or another wired and/or wireless communications connection. In addition, the communication network 104 may provide the communication drones 102a-102h and 102x access to a drone operations controller, which may also be coupled thereto.

Each wireless connection 114 may include a plurality of carrier signals, frequencies, or frequency bands, each of which may include a plurality of logical channels. The wireless connections 114 may utilize one or more radio access technologies (RATs), which may be the same as or different from one another. Examples of RATs that may be used in wireless connections 114 may include relatively short range RATs, such as ZigBee, Bluetooth, and Bluetooth Low Energy (LE). Further examples of RATs that may be used in one or more of the various wireless communication links within the communication system 100 include medium range protocols such as Wi-Fi, LTE-U, LTE-Direct, Local Area Augmentation System (LAAS), Multefire, and other medium range technologies. In addition, long range protocols may be used, such as LTE, 3G, 4G, 5G, GSM, CDMA, Wideband Code Division Multiple Access (WCDMA), Worldwide Interoperability for Microwave Access (Wi-MAX), TDMA, and other mobile telephony communication RATs.

Figure 2:
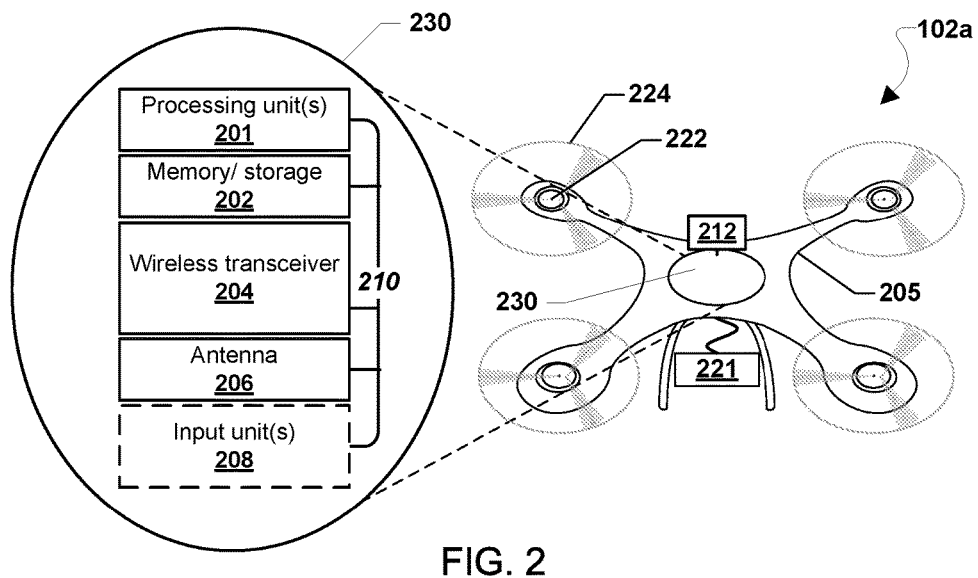
FIG. 2 is a component block diagram illustrating components of a communication drone according to various embodiments.

Various embodiments may be implemented using a variety of drones configured with wireless communication capabilities to function as a communication drone for CoD services, an example of which is a four-rotor drone illustrated in FIG. 2. With reference to FIGS. 1 and 2, the communication drone 102a is illustrated as an example of one or more of drones 102a-102h and 102x (shown in FIG. 1). The communication drone 102a may include a body 205 (i.e., fuselage, frame, etc.) that may be made out of any combination of plastic, metal, or other materials suitable for flight. For ease of description and illustration, some detailed aspects of the communication drone 102a are omitted, such as wiring, frame structure, power source, landing columns/gear, or other features that would be known to one of skill in the art. In addition, although the example communication drone 102a is illustrated as a "quad-copter" with four rotors, the one or more of drones 102a-102h and 102x may include more or fewer than four rotors. Also, the one or more of drones 102a-102h and 102x may have similar or different configurations, numbers of rotors, and/or other aspects. Various embodiments may also be implemented with other types of drones, including other types of autonomous aircraft, land vehicles, waterborne vehicles, or a combination thereof.

The body 205 may include a processor 230 that is configured to monitor and control the various functionalities, subsystems, and/or other components of the communication drone 102a. For example, the processor 230 may be configured to monitor and control various functionalities of the communication drone 102a, such as any combination of modules, software, instructions, circuitry, hardware, etc. related to propulsion, navigation, power management, sensor management, and/or stability management.

The processor 230 may include one or more processing unit(s) 201, such as one or more processors configured to execute processor-executable instructions (e.g., applications, routines, scripts, instruction sets, etc.) to control flight and other operations of the communication drone 102a, including operations of various embodiments. In some embodiments, the processor 230 may be coupled to a memory unit 202 configured to store data (e.g., flight plans, obtained sensor data, received messages, applications, etc.).

In various embodiments, the processor 230 may be coupled to cellular communication systems and router 221 configured to provide cellular or local area hotspot communication capabilities for various types of UE using any of a variety of wireless communication protocols.

Communication drones may navigate using navigation systems, such as Global Navigation Satellite System (GNSS), Global Positioning System (GPS), etc. In some embodiments, the communication drone 102a may use an alternate source of positioning signals (i.e., other than GNSS, GPS, etc.). The communication drone 102a may use location information associated with the source of the alternate signals together with additional information (e.g., dead reckoning in combination with last trusted GNSS/GPS location, dead reckoning in combination with a position of the communication drone takeoff zone, etc.) for positioning and navigation in some applications. Thus, the communication drone 102a may navigate using a combination of navigation techniques, including dead-reckoning, camera-based recognition of the land features below and around the communication drone 102a (e.g., recognizing a road, landmarks, highway signage, etc.), etc. that may be used instead of or in combination with GNSS/GPS location determination and triangulation or trilateration based on known locations of detected wireless access points.

In some embodiments, the processor 230 of the communication drone 102a may further include various input units 208 for receiving control instructions, data from human operators or automated/pre-programmed controls, and/or for collecting data indicating various conditions relevant to the communication drone 102a. For example, the various input units 208 may include camera(s), microphone(s), sensor(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. The various components of the processor 230 may be connected via a bus 210 or other similar circuitry.

Drones may be winged or rotor craft varieties. For example, the communication drone 102a may be a rotary propulsion design that utilizes one or more rotors 224 driven by corresponding motors 222 to provide lift-off (or take-off) as well as other aerial movements (e.g., forward progression, ascension, descending, lateral movements, tilting, rotating, etc.). The communication drone 102a is illustrated as an example of a communication drone that may utilize various embodiments, but is not intended to imply or require that various embodiments are limited to rotor craft drones. Instead, various embodiments may be implemented on winged drones as well. Further, various embodiments may equally be used with land-based autonomous vehicles, water-borne autonomous vehicles, and space-based autonomous vehicles.

A rotor craft drone 102a may utilize motors 222 and corresponding rotors 224 for lifting off and providing aerial propulsion. For example, the communication drone 102a may be a quad-copter" that is equipped with four motors 222 and corresponding rotors 224. The motors 222 may be coupled to the processor 230 and thus may be configured to receive operating instructions or signals from the processor 230. For example, the motors 222 may be configured to increase rotation speed of their corresponding rotors 224, etc. based on instructions received from the processor 230. In some embodiments, the motors 222 may be independently controlled by the processor 230 such that some rotors 224 may be engaged at different speeds, using different amounts of power, and/or providing different levels of output for moving the communication drone 102a. For example, motors 222 on one side of the body 205 may be configured to cause their corresponding rotors 224 to spin at a higher rotation per minute (RPM) than rotors 224 on the opposite side of the body 205 in order to balance the communication drone 102a burdened with an off-centered payload.

The body 205 may include a power source 212 that may be coupled to and configured to power the various other components of the communication drone 102a as well as the cellular communication system and router 221. For example, the power source 212 may be a rechargeable battery for providing power to operate the motors 222, the cellular communication system and router 221, and/or the units of the processor 230.

While the various components of the communication drone 102a are illustrated (e.g., in FIG. 2) as separate components, some or all of the components (e.g., the memory 202, the processing units 201, the wireless transceiver 204, and other elements) may be integrated together in a single device or unit, such as a system-on-chip. The communication drone 102a and elements thereof may also include other components not described.

Figure 3:
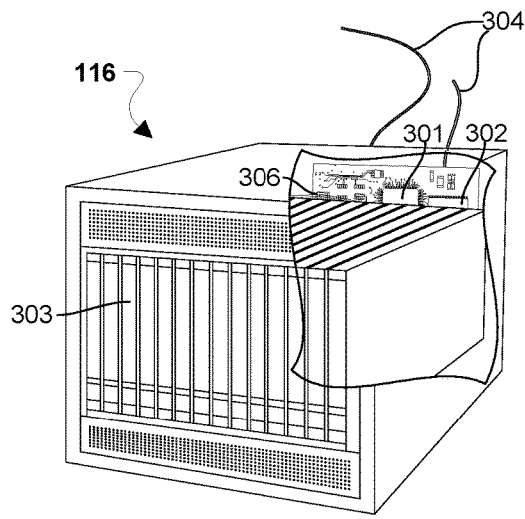
FIG. 3 is a component block diagram illustrating components of a server according to various embodiments.

In various embodiments, a communication drone (e.g., communication drones 102a-102h and 102x in FIGS. 1 and 2) may transmit communications to or receive communications from a drone operations controller, which may be implemented in a server (e.g., servers 106, 116) or other remote computing device, an example of which is illustrated in FIG. 3. With reference to FIGS. 1-3, the communication drones (e.g., communication drones 102a-102h and 102x) may communicate with the server 116 regarding operational safety communications and/or payload communications. The server 116 may be the same or similar to the one or more network servers (e.g., 106), which may typically include a processor 301 coupled to volatile memory 302 and a large capacity nonvolatile memory, such as a disk drive 303. The server 116 may also include a floppy disc drive, compact disc (CD) or digital video disc (DVD) drive 306 coupled to the processor 301. The server 116 may also include network access ports 304 (or interfaces) coupled to the processor 301 for establishing data connections with a network (e.g., communication network 104), systems supported by the network (e.g., the Internet), and/or other remote computing devices and servers. Similarly, the server 116 may include additional access ports, such as universal serial bus (USB), Fire wire, Thunderbolt, and the like for connecting to communication networks (e.g., the Internet, a wireless communication network, the public switched telephone network, etc.). As a drone mission controller, the server 116 may be configured to establish network interface connections with wireless networks for communicating (e.g., sending commands and receiving status information) with communication drones.

The server 116 may also include various other components not described. For example, the server 116 may include a number of processing components such as modems, transceivers, subscriber identification module (SIM) cards, additional processors, additional hard drives, universal serial bus (USB) ports, Ethernet ports, and/or other types of wired or wireless input/output ports, keyboard, mouse, speaker, microphone, display screen, touchscreen, and many other components known in the art.

Figure 4:
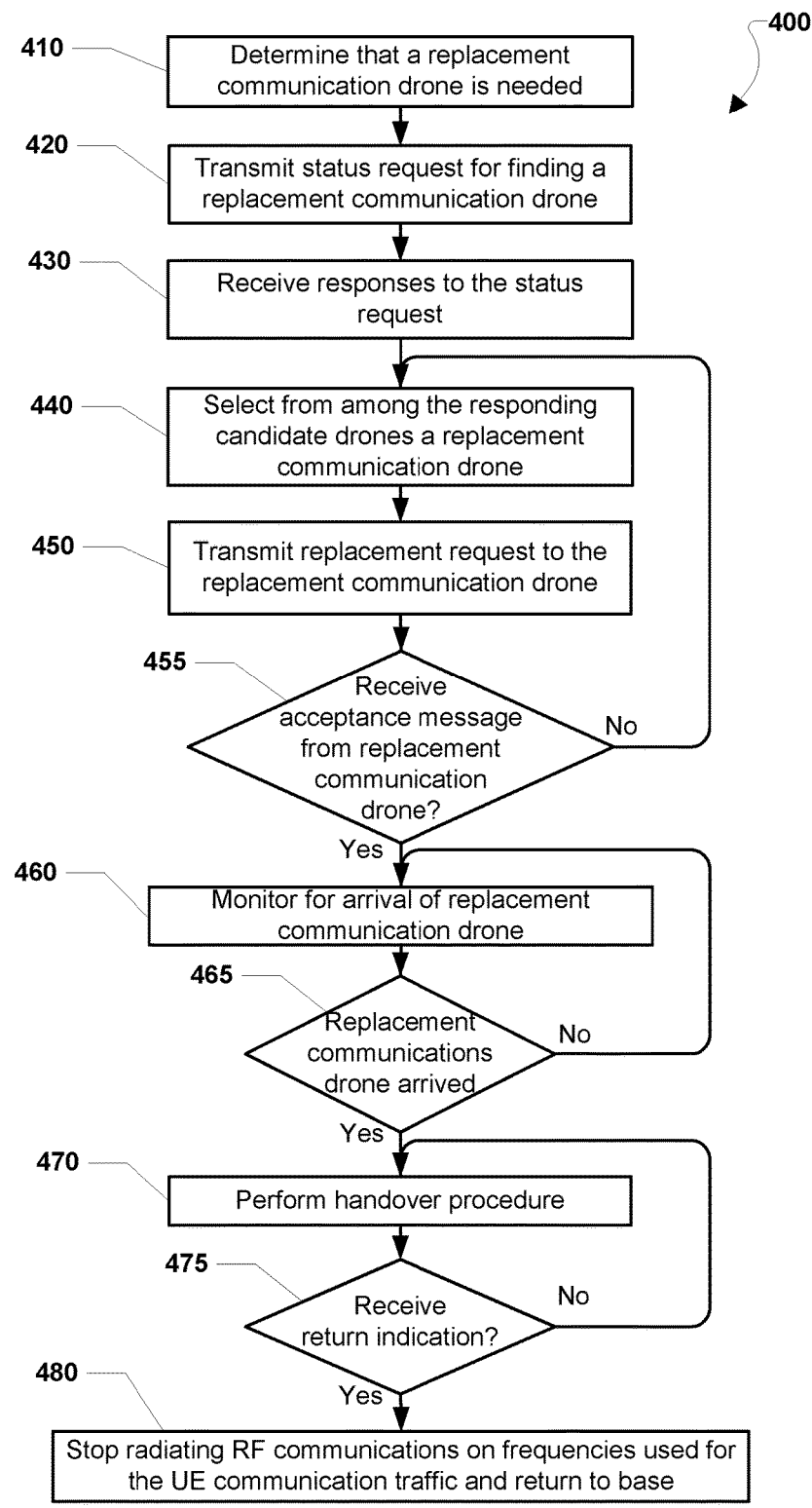
FIG. 4 is a process flow diagram illustrating a method for traffic offloading between communications drones according to various embodiments.

FIG. 4 illustrates a method 400 for offloading UE communication traffic between communications drones according to various embodiments. With reference to FIGS. 1-4, the operations of the method 400 may be performed by a processor, such as the processor 230 of the communication drone 102a (or communication drones 102b-102h and 102x), the processor 301 of the server (e.g., 106, 116), other remote computing devices, or combinations thereof.

In block 410, the processor may determine that a communication drone among a plurality of communication drones working together in a communication network needs to be replaced. The communication drone needing replacement may transmit one or more replacement requests in order to be replaced by another communication drone. The communication drone that transmits the one or more replacement requests is referred to herein as the, "requesting communication drone.".

A communication drone may need to be replaced for a variety of reasons, including running low on power, experiencing operating difficulties, needing maintenance, etc. For example, a processor of the communication drone 102a may determine that the charge state of the onboard battery is below a certain threshold, which may correspond to a minimum amount of stored power for the communication drone 102a to handover communication services to a replacement communication drone (e.g., communication drones 102b-102h and 102x) before returning to base or a charging station. Alternatively, a processor of the server (e.g., 106, 116) tracking the operations of various communication drones may notify the communication drone 102a that the communication drone 102a needs to be replaced.

In block 420, the processor may transmit, via a wireless transceiver (e.g., 204), a status request for finding a replacement communication drone. The transmission of the status request may be in response to determining the requesting communication drone needs to be replaced in block 410. The status request may be transmitted so that it may be received by at least one communication drone (e.g., communication drones 102b-102h and 102x), communication nodes, and/or a server (e.g., 106, 116) for finding a replacement communication drone. The status request may inform the at least one communication drone and/or the server that the requesting communication drone needs to be replaced. The status request may also include a capacity inquiry that requests information from communication drones that could serve as a replacement communication drone (i.e., "a candidate communication drone") regarding currently carried traffic, whether the drone is a serving cell, current battery status, operating status, and current position. The requesting communication drone may wait for responses and when responses are received, the processor of the requesting communication drone may select one of the responding candidate communication drones to replace the requesting communication drone. The selected one of the responding candidate communication drones is referred to as the, "replacement communication drone."

In block 430, the requesting communication drone may receive (e.g., via a transceiver 204) responses to the status request. In some embodiments, only those communication drones that are in a standby mode waiting to be summoned (e.g., parked and fully charged) may respond to the status request. In some embodiments, all communication drones may respond, whether in a standby mode or actively supporting wireless communications. The responses received from each communication drone may include status information. The status information from each communication drone may include, for example, one or more of an indication of a current communication state (e.g., whether the drone is currently serving traffic), battery status, available power levels or flight time remaining, position, altitude, heading and speed, current activities of the candidate communication drone and the like. For example, if all candidate communication drones respond, some candidate communication drones will transmit status information indicating that they are currently serving communication traffic (i.e., in an active communication state), provide their current battery level (or remaining flight time), and/or a current position (e.g., latitude, longitude and altitude information). Responding candidate communication drones may also indicate their current heading and speed.

In block 440, the processor of the requesting communication drone or the server may select from among the responding candidate communication drones a particular candidate communication drone to replace the requesting communication drone. The selection may be based on information within the received responses to the status request. The selection of the replacement communication drone may be based on a variety of factors, including for example, capability to handle a current volume of network traffic, a battery level threshold (e.g., ≥95%) of the candidate communication drone, whether the candidate communication drone can support and operating status requirement, proximity of the candidate communication drone to the replacement communication drone, and/or a minimum flight time required for the candidate communication drone to reach the replacement communication drone. In the operations in block 440, the requesting communication drone may select as the replacement communication drone the candidate communication drone that is not already carrying traffic, has sufficient battery reserve, and will not take too long replace the requesting communication drone.

Selections scenarios may include cases in which no neighboring communication drone is available or suitable (i.e., no candidate communication drone satisfies the requirements of the requesting communication drone). In the event that no candidate communication drone receiving the replacement request is available or suitable to serve as a replacement communication drone, a nearby standby communication drone (e.g., communication drone 102*x*) may be dispatched as the replacement candidate communication drone. Alternatively, one of the neighboring communication drones may be forced to relinquish currently carried and/or managed communication traffic in order to replace the requesting communication drone.

Once a communication drone is selected to be the replacement communication drone, the processor of the requesting communication drone or the server may transmit (e.g., via the transceiver 204) a replacement request to the replacement communication drone in block 450. The replacement request may include configuration information for the replacement communication drone to use when taking over for the requesting communication drone. For example, the replacement request may include the coordinates to which the replacement communication drone should fly (i.e., a target position adjacent to the station or position of the requesting communication drone). The replacement request may also include identification information (e.g., the physical cell identity or "PCI") of the requesting communication drone and identification information (e.g., PCI) of at least one neighboring communication drone that will enable the replacement communication drone to select an unoccupied or collision free PCI. In the event that a standby communication drone (i.e., a communication drone not currently in service) has been selected as the replacement communication drone, the replacement request may include a command for the standby communication drone to become active and function as the replacement communication drone.

After the replacement request is transmitted, the requesting communication drone and/or the server may await a response from the replacement communication drone. The replacement communication drone may respond with an acceptance message, a rejection message, or no response. In various embodiments, if no response is received by the requesting communication drone from the replacement communication drone selected within a predetermined period, such a circumstance may be treated as equivalent to receiving a rejection message.

In determination block 455, the processor of the requesting communication drone and/or the server may determine whether an acceptance message was received from the replacement communication drone.

In response to determining that no acceptance message was received from the replacement communication drone, such as a rejection message was received or no message was received after a predetermined period (i.e., determination block 455="No"), the processor of the requesting communication drone or the server may select another replacement communication drone as a replacement from the responding candidate communication drones in block 440.

In response to determining that an acceptance message was received from the selected candidate communication drone (i.e., determination block 455="Yes"), the processor of the requesting communication drone and/or the server may begin monitoring for the arrival of the replacement communication drone in block 460.

In various embodiments, the replacement communication drone may fly toward the requesting communication drone without radiating RF communications on frequencies used for the UE communication traffic in order to avoid interfering with other communication drones while in transit to the requesting communication drone. The replacement communication drone may fly to a position adjacent to the requesting communication drone (i.e., within a threshold range or radius of a cell location). The RF planning designates a distance between drones, which is considered "adjacent," that allows the requesting communication drone to offload traffic to the replacement communication drone. Once adjacent to the requesting communication drone (i.e., at the target position), the replacement communication drone may begin radiating at a selected collision free PCI.

In determination block 465, the processor of the requesting communication drone may determine whether the replacement communication drone has arrived at a target position adjacent to the station or position of the requesting communication drone. For example, the processor may monitor for an arrival notification message transmitted by the replacement communication drone. As another example, the processor may monitor for wireless communications by the replacement communication drone. In response to determining that the replacement communication drone has not arrived at the target position (i.e., determination block 465="No"), the processor may continue monitoring for the arrival of the replacement communication drone in block 460.

In response to determining that the replacement communication drone has arrived at the target position (i.e., determination block 465="Yes"), the processor of the requesting communication drone and/or the server may perform a handover procedure in block 470. The handover procedure in block 470 may enable the replacement communication drone to take over the handling of communicating traffic with various UE from the requesting communication drone.

The handover to the UE may be executed in one of at least three ways; a forced handover, a movement-induced handover, or a reduced power-induced handover.

A forced handover may involve the requesting (i.e., departing) communication drone transmitting a command to any UE receiving and/or transmitting traffic using the departing communication drone instructing the UE to switch over to using the replacement communication drone.

A movement-induced handover may involve the requesting communication drone leaving a station or position while the replacement communication drone remains in place. As the requesting communication drone moves away, the UE will observe decreases in the signal strength of the departing communication drone (i.e., the requesting communication drone) while the replacement communication drone's signal remains strong, which will eventually trigger a handover.

A reduced power-induced handover may involve the requesting communication drone reducing the RF signal power transmission levels with or without leaving the stationed position, which the UE may detect as a decreasing signal. Meanwhile, the replacement communication drone's signal may then be detected as the more dominant signal, which will trigger a handover.

During the handover procedure, the requesting communication drone may ensure handover is complete before leaving a cell boundary of the requesting communication drone in order to avoid interference with cell boundaries of neighboring communication drones. In this way, before the requesting communication drone leaves, the requesting communication drone may reduce or stop RF power output on frequencies used for UE communication traffic in order to avoid interference with neighboring communication drones. The departing drone may continue radiating RF communications on other frequencies that communicate with a controller, server, control center, or the like for control, coordination, navigation or other communicates related to managing the communication drones and not used for the UE communication traffic.

Once the handover procedure is complete and the replacement communication drone has completely taken over the handling of communicating traffic, the replacement communication drone may transmit a return indication to the requesting communication drone. The return indication may let the requesting communication drone know that the handover procedure is complete and that the requesting communication drone is relieved of communication functions within the communication network.

In determination block 475, the processor of the requesting communication drone and/or the server may determine whether a return indication is received from the replacement communication drone. The return indication indicates that the traffic offloading is complete and that the replacement communication drone is ready to fully take over traffic handling from the requesting communication drone.

In response to determining that the return indication is not received from the replacement communication drone (i.e., determination block 475="No"), the processor may continue performing the handover procedure in block 470. In response to determining that the return indication is received from the replacement communication drone (i.e., determination block 475="Yes"), the requesting communication drone may stop radiating RF communications on frequencies used for the UE communication traffic and return to base in block 480.

The processor may periodically repeat the operations in blocks 410-480 to further offload traffic between communications drones. Thus, the method 400 provides a way for a communication drone to request a replacement and perform traffic offloading communications duties to a replacement communication drone.

Figure 5:
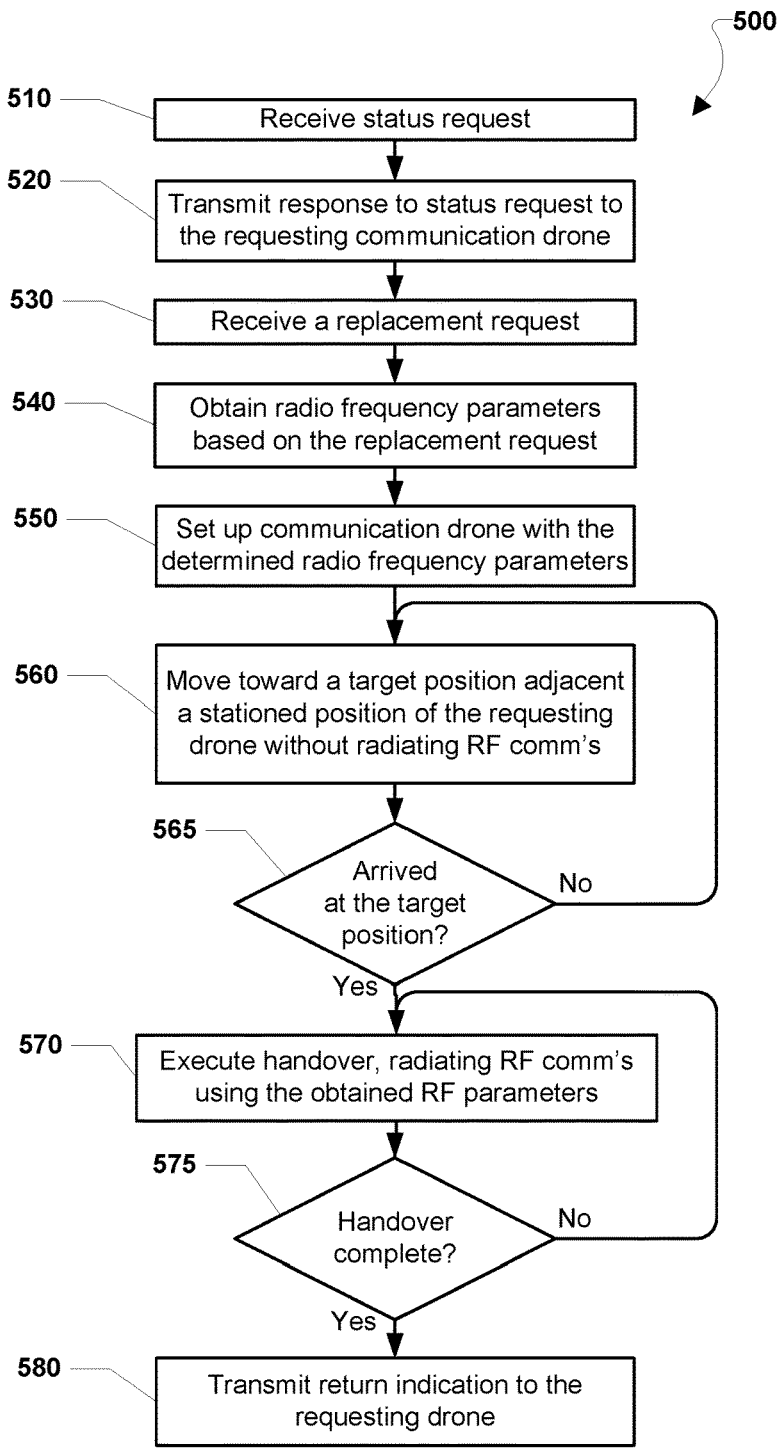
FIG. 5 is a process flow diagram illustrating a method for traffic offloading between communications drones according to various embodiments.

FIG. 5 illustrates a method 500 for a communication drone (a "candidate communication drone") to take over communications services (i.e., UE communication traffic between communication drones) from a communication drone requesting replacement according to various embodiments. With reference to FIGS. 1-5, the operations of the method 500 may be performed by a processor of a communication drone (e.g., the processor 230 of at least one of candidate communication drones 102b-102h).

In block 510, the processor of a candidate communication drone may receive a status request from a requesting communication drone (e.g., communication drone 102a) directly or via the server. The status request may inform the candidate communication drone that the requesting communication drone needs to be replaced. The status request may request information regarding, for example, currently carried traffic, whether the candidate communication drone is a serving cell, current battery status, operating status, and current position of the candidate communication drone.

In block 520, the processor of the candidate communication drone may transmit to the requesting communication drone, directly or via the server, a response to the status request. The response to the status request may include status information of the candidate communication drone. For example, the response may include whether the candidate communication drone is a serving cell, currently carried traffic, current battery status, operating status, and current position of the candidate communication drone.

In block 530, the processor of the candidate communication drone may receive a replacement request from the requesting communication drone (e.g., communication drone 102a) directly or via the server. The replacement request may instruct the candidate communication drone to replace the requesting communication drone and how to do so. Also, the replacement request may indicate how the requesting communication drone will handle the communication handover. For example, as part of a communications handover, the requesting communication drone may lower transmission power levels, the timing and sequence of which may be coordinated with the transmission power levels of the candidate communication drone. Similarly, the replacement request may inform the candidate communication drone whether the handover will be a forced handover, a movement-induced handover, or a reduced power-induced handover. The replacement request may include further details for the candidate communication drone to use when taking over for the requesting communication drone. For example, the replacement request may include identification information (e.g., the PCI) of the requesting communication drone and at least one neighboring communication drone to the requesting communication drone. Unless the candidate communication drone receiving the replacement request refuses and/or is unable to accept the replacement request, the candidate communication drone receiving the replacement request is referred to herein as the "replacement communication drone."

In block 540, the processor of the replacement communication drone may obtain the RF communication parameters to be used when taking over communication duties from the requesting communication drone. The RF communication parameters may be determined based on information (radio frequency data) within the replacement request (e.g., the PCI of the requesting communication drone and one or more neighboring communication drones). The processor of the replacement communication drone may perform radio frequency planning to determine the RF communication parameters to use and self-select a collision free PCI. Collision-free PCI means that no communication drones within a communication radius have the same PCI. Alternatively, the collision-free PCI may be selected by a server or the requesting communication drone. Selecting a collision-free PCI ensures that the replacement communication drone will not interfere with either the requesting communication drone or any neighboring communication drones.

In block 550, the processor of the replacement communication drone may set the replacement communication drone with the RF communication parameters (i.e., obtained in block 540).

In block 560, the replacement communication drone may move toward a target position adjacent a stationed position of the requesting communication drone, without radiating RF communications on frequencies used for the UE communication traffic. For example, the frequencies used for the UE communication traffic may include frequencies of the communication services monitored or used by the UE. The replacement communication drone may continue to communicate with a controller, server, control center, or the like using other frequencies for coordination and navigation of communication drones. The target position may be limited by a capacity or requirements of an air-interface (e.g., two-way wireless communication links 114) used by the drones (e.g., the plurality of communication drones 102a-102h) to communicate with the communication network (e.g., 104) in an environment (e.g., the stadium 10). Thus, the distance between the target position and the stationed position may be selected to accommodate the circumstances of a particular environment.

In determination block 565, the processor of the replacement communication drone may determine whether the replacement communication drone has arrived at the target position. In some embodiments, the processor of the replacement communication drone may transmit an arrival indication to the requesting communication drone, directly or via the server, upon arriving at the target position. In response to determining the replacement communication drone has not arrived at the target position (i.e., determination block 565="No"), the processor may continue to move the replacement communication drone toward the target position in block 560.

In response to determining the replacement communication drone has arrived at the target position (i.e., determination block 565="Yes"), the processor of the replacement communication drone may execute a handover procedure. The handover procedure, in block 570, may include radiating RF communications on frequencies used for the UE communication traffic. The radiated RF communications may use the set RF communication parameters obtained in block 540. In this way, the replacement communication drone may support handover of UE communication traffic from the requesting communication drone.

In determination block 575, the processor of the replacement communication drone may determine whether handover is complete. Signaling between the UE (i.e., the at least one remote computing device involved in the handover) and the replacement communication drone may indicate to the processor of the replacement communication drone that the handover is complete. For example, the UE may transmit a message to the replacement communication drone acknowledging a successfully complete handover. So long as the handover is not complete (i.e., determination block 575="No"), the processor may continue to execute the handover in block 570.

In response to determining that handover of UEs is complete (i.e., determination block 575="Yes"), the processor of the replacement communication drone may transmit a return indication to the requesting communication drone in block 580.

The processor may periodically repeat the operations in blocks 510-580 to further offload traffic between the communications drones. Thus, the method 500 provides a way for a replacement communication drone to offload UE communication offloading from a requesting communications drone requiring replacement.

Figure 6:
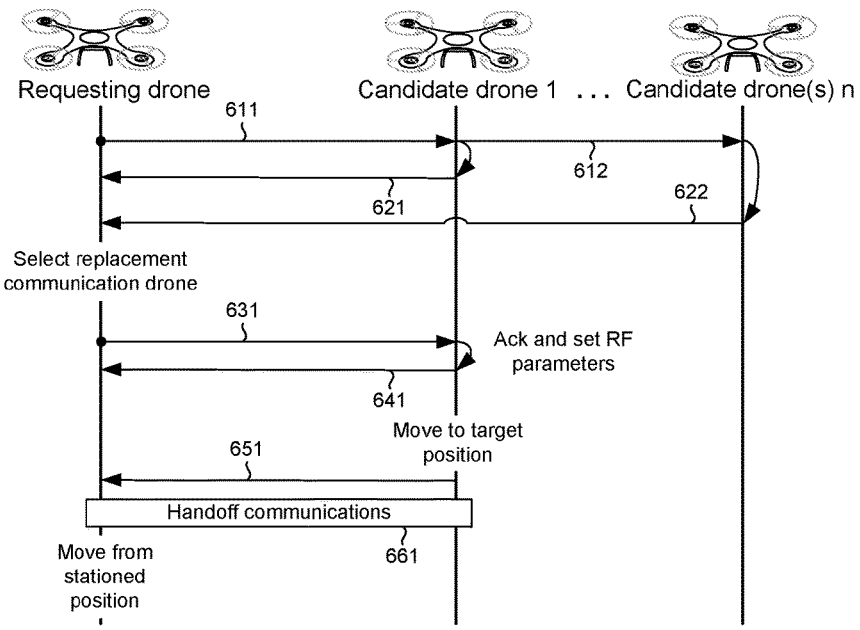
FIG. 6 is a communication flow diagram for traffic offloading between communications drones in accordance with various embodiments.

FIG. 6 illustrates communication flows 600 for offloading user equipment communication traffic between communications drones in accordance with various embodiments. With reference to FIGS. 1-6, the operations of the communication flow 600, may be performed by a requesting communication drone (e.g., 102a) communicating with a plurality of candidate communication drones (e.g., communication drones 102b-102x) directly or via a server (e.g., 106, 116). Such communications may include signaling information, identification codes, and other elements associated with communication networks, communication drones, status information, requests, and other communications. The candidate communication drones are represented by a first candidate communication drone (i.e., "Candidate drone 1") and one or more additional candidate communication drones (i.e., "Candidate drone(s) n"). Although any of a plurality of candidate communication drone may end up being a replacement communication drone, for ease of explanation Candidate drone 1 is considered the replacement communication drone in communication flow 600.

In communication flows 600, the requesting communication drone has determined that it needs to be replaced. In response, the requesting communication drone transmits a first status request 611 (e.g., in block 420 of the method 400) to the first candidate communication drone (i.e., Candidate drone 1) and/or at least one second status request 612 to the one or more additional candidate communication drones (e.g., Candidate drone n). The status requests 611, 612 may be used by the requesting communication drone to find a replacement and may include a capacity inquiry (e.g., whether the candidate drone is currently carrying traffic or is a serving cell). In response to receiving the status requests 611, 612, the candidate communication drone 1 may transmit to the requesting communication drone a response 621 to the first status request 611. Similarly, other candidate communication drones may transmit a response 622 to the at least one second status request 612.

The requesting communication drone may consider the received responses 621, 622 for selecting a replacement communication drone (e.g., candidate drone 1) for replacement of the requesting communication drone from among the plurality of candidate communication drones. Once the replacement communication drone is selected, the requesting communication drone may transmit a replacement request 631 to the candidate communication drone selected to be the replacement communication drone (e.g., candidate drone 1), directly or via the server. As used herein, the candidate communication drone selected to be the replacement communication drone is herein referred to as the "replacement communication drone." In response to receiving the replacement request 631, the replacement communication drone may acknowledge (Ack) and set the RF communication parameters needed to replace the requesting communication drone. Setting the radio frequency (RF) parameters may be based on and determined from information obtained from the replacement request. Once the RF parameters are set, the replacement communication drone may transmit a confirmation message 641 to the requesting communication drone and start moving toward the target position. Alternatively, the RF parameters may be set after the replacement communication drone reaches the target position.

The replacement communication drone may transmit an arrival indication 651 to the requesting communication drone in order to inform the requesting communication drone that the replacement communication drone has arrived at the target position. Alternatively, the requesting communication drone and the replacement communication drone may exchange position information or otherwise use proximity sensors to detect when the replacement communication drone arrives at the target position. Once the replacement communication drone arrives at the target position, the requesting communication drone may perform a handover procedure 661. The handover procedure 661 may be designed to include a forced handover, a movement-induced handover, a reduced power-induced handover, or a combination thereof.

Once the handover procedure 661 is complete and the replacement communication drone has completely taken over the handling of communicating traffic, the requesting communication drone may move from the stationed position and head toward a base or other designated location.

Figure 7:
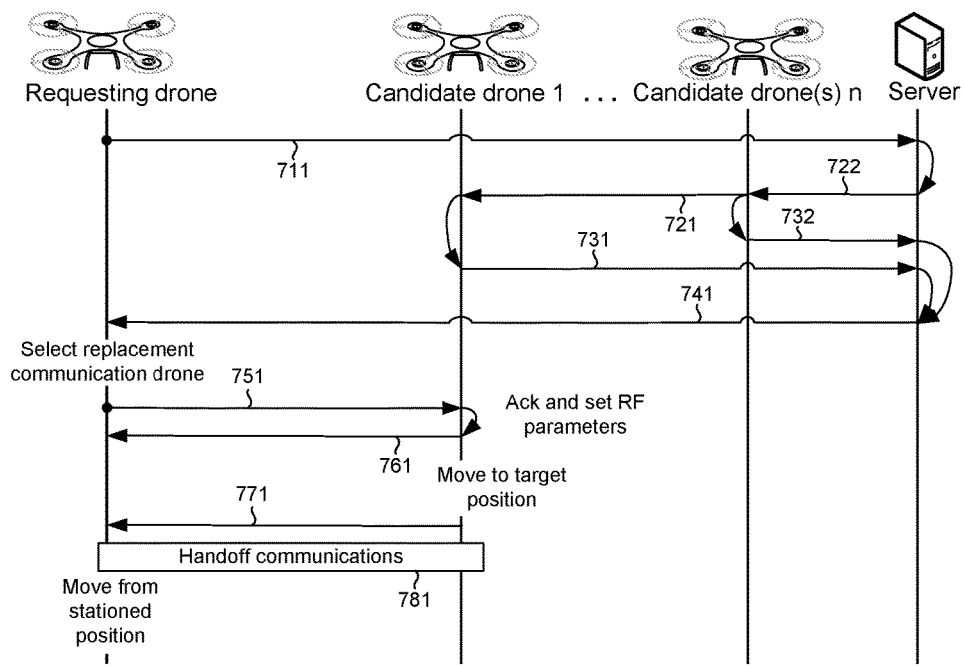
FIG. 7 is a communication flow diagram for traffic offloading between communications drones in accordance with various embodiments.

FIG. 7 illustrates a communication flow 700 for offloading user equipment communication traffic between communications drones in accordance with various embodiments. With reference to FIGS. 1-7, the operations of the communication flow 700, may be performed by a requesting communication drone (e.g., 102a) communicating with a server (e.g., servers 106, 116) and a plurality of candidate communication drones (e.g., communication drones 102b-102x) directly or via the server. As described with reference to FIG. 6, the candidate communication drones are represented by a first candidate communication drone (i.e., "Candidate drone 1") and one or more additional candidate communication drones (i.e., "Candidate drone(s) n"). For ease of explanation, candidate drone 1 is considered the replacement communication drone selected to replace the requesting communication drone in communication flow 700.

In communication flows 700, the requesting communication drone has determined that it needs to be replaced. In accordance with various embodiments, communications with candidate communication drones may be through an intermediary, such as a server (e.g., server 106, 116). Thus, the requesting communication drone transmits a first status request 711, which is received by the server. The first status request 711 may be used by the server to find a replacement communication drone. In response to receiving the first status request 711, the server may transmit at least one second status request 721, 722 to the first candidate communication drone and/or the one or more additional candidate communication drones. Upon receipt of the at least one second status request 721, 722, the candidate communication drone 1 may transmit to the server a response 731. Similarly, the candidate communication drone(s) n may transmit to the server a response 732. The server may then forward information 741 obtained from the received responses 731, 732 to the requesting communication drone.

The requesting communication drone may consider the received responses 731, 732 for selecting a replacement communication drone (e.g., candidate drone 1) for replacement of the requesting communication drone from among the plurality of candidate communication drones. Once the replacement communication drone is selected, the requesting communication drone may transmit a replacement request 751 to the candidate communication drone selected to be the replacement communication drone (e.g., candidate drone 1) directly or via the server. As used herein, the candidate communication drone selected to be the replacement communication drone is herein referred to as the "replacement communication drone." In response to receiving the replacement request 751, the replacement communication drone may acknowledge (Ack) and set the RF communication parameters needed to replace the requesting communication drone. Setting the radio frequency (RF) parameters may be based on and determined from information obtained from the replacement request. Once the RF parameters are set, the replacement communication drone may transmit a confirmation message 761 to the requesting communication drone (directly or via the server) and start moving toward the target position.

The replacement communication drone may transmit an arrival indication 771 to the requesting communication drone, directly or via the server, in order to inform the requesting communication drone that the replacement communication drone has arrived at the target position. Alternatively, the requesting communication drone and the replacement communication drone may exchange position information or otherwise use proximity sensors to detect when the replacement communication drone arrives at the target position. Once the replacement communication drone arrives at the target position, the requesting communication drone may perform a handover procedure 781. Once the handover procedure 781 is complete and the replacement communication drone has completely taken over the handling of communicating traffic, the requesting communication drone may move from the stationed position and head toward a base or other designated location.

Figure 8:
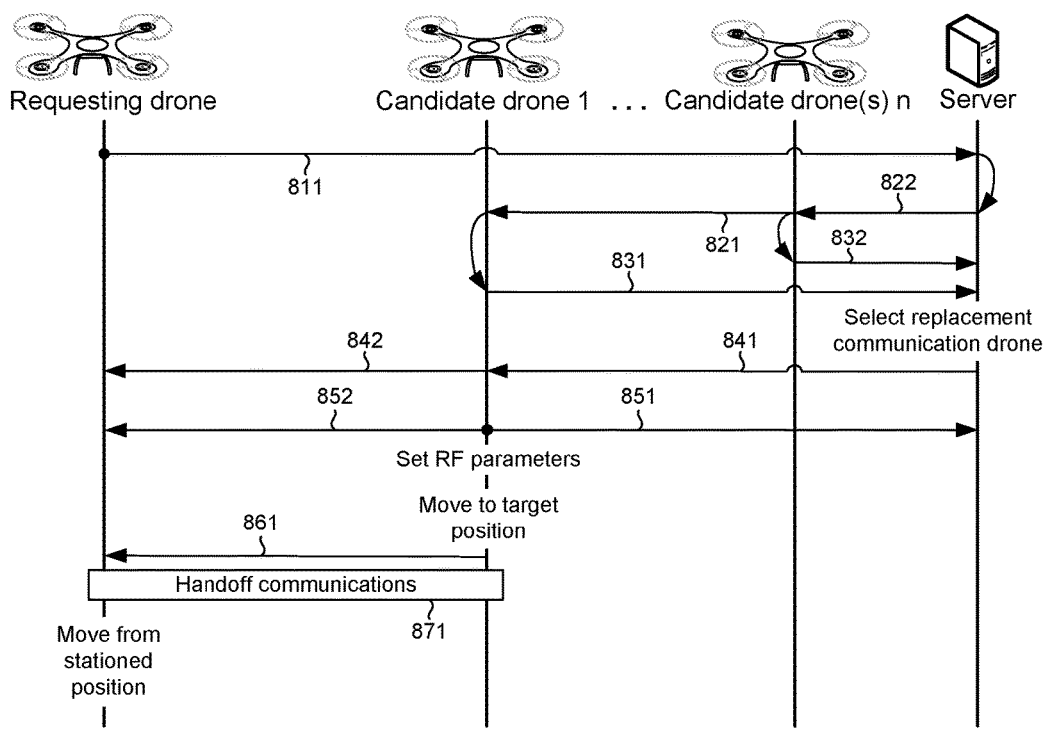
FIG. 8 is a communication flow diagram for traffic offloading between communications drones in accordance with various embodiments.

FIG. 8 illustrates a communication flow 800 for offloading user equipment communication traffic between communications drones in accordance with various embodiments. With reference to FIGS. 1-8, the operations of the communication flow 800, may be performed by a requesting communication drone (e.g., 102a) communicating with a server (e.g., servers 106, 116) and a plurality of candidate communication drones (e.g., communication drones 102b-102x), directly or via the server. As described with reference to FIGS. 6 and 7, the candidate communication drones are represented by a first candidate communication drone (i.e., "Candidate drone 1") and one or more additional candidate communication drones (i.e., "Candidate drone(s) n"). For ease of explanation, candidate drone 1 is considered the replacement communication drone selected to replace the requesting communication drone in communication flow 800.

In communication flows 800, the requesting communication drone has determined that it needs to be replaced. In accordance with various embodiments, communications with candidate communication drones may be through an intermediary, such as a server (e.g., servers 106, 116). The server may also be used to select the replacement communication drone from among the plurality of candidate communication drones. Thus, the requesting communication drone transmits a first status request 811, which is received by the server. The first status request 811 may be used by the server to select the replacement communication drone. In response to receiving the first status request 811, the server may transmit at least one second status request 821, 822 to the candidate communication drone 1 and/or the one or more additional candidate communication drone(s) n. Upon receipt of the at least one second status request 821, 822, the candidate communication drone 1 may transmit to the server a response 831. Similarly, the candidate communication drone(s) n may transmit to the server a response 832. The server may then consider the received responses 831, 832 for selecting a replacement communication drone (e.g., candidate drone 1) for replacement of the requesting communication drone from among the plurality of candidate communication drones.

Once the server selects a candidate communication drone to be the replacement communication drone from among the plurality of candidate communication drones, the server may transmit a replacement request 841 to the candidate communication drone selected to be the replacement communication drone (e.g., candidate drone 1). In addition, the server may transmit a selection notification 842 to the requesting communication drone. In response to receiving the replacement request 841, the replacement communication drone may transmit acknowledges 851, 852 and set the RF communication parameters needed to replace the requesting communication drone. Setting the radio frequency (RF) parameters may be based on and determined from information obtained from the replacement request. Once the RF parameters are set, the replacement communication drone may start moving toward the target position.

The replacement communication drone may transmit an arrival indication 861 to the requesting communication drone in order to inform the requesting communication drone that the replacement communication drone has arrived at the target position. Alternatively, the requesting communication drone and the replacement communication drone may exchange position information or otherwise use proximity sensors to detect when the replacement communication drone arrives at the target position. Once the replacement communication drone arrives at the target position, the requesting communication drone may perform a handover procedure 871. Once the handover procedure 871 is complete and the replacement communication drone has completely taken over the handling of communicating traffic, the requesting communication drone may move from the stationed position and head toward a base or other designated location.

The various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable ROM (EEPROM), FLASH memory, compact disc ROM (CD-ROM) or other optical disk storage, magnetic disk storage or other magnetic storage smart objects, or any other medium that may be used to store desired program code in the form of instructions or data structures and that may be accessed by a computer. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method of offloading user equipment communication traffic between communications drones, comprising:
   receiving, at a candidate communication drone, a replacement request from a requesting communication drone, wherein the replacement request includes identification information of the requesting communication drone;
   setting radio frequency (RF) communication parameters for the candidate communication drone to take over communications of the requesting communication drone,
      wherein the RF communication parameters are based on the replacement request and distinguish the candidate communication drone from the requesting communication drone and at least one communication drone neighboring the requesting communication drone ("at least one neighboring communication drone");
   moving the candidate communication drone toward a target position adjacent a position of the requesting communication drone without radiating RF communications on one or more frequencies used for the user equipment communication traffic for taking over communication services from the requesting communication drone; and
   radiating RF communications on the one or more frequencies used for the user equipment communication traffic using the set RF communication parameters to begin taking over the communication services from the requesting communication drone upon arriving at the target position.

2. The method of claim 1, further comprising:
   receiving, by the candidate communication drone, a status request from the requesting communication drone; and
   transmitting, from the candidate communication drone to the requesting communication drone, status information in response to the status request.

3. The method of claim 2, wherein transmitting, from the candidate communication drone to the requesting communication drone, status information in response to the status request comprises transmitting one or more of an indication of a current communication state, battery status, available power level, flight time remaining, position, altitude, heading, speed, and current activities of the candidate communication drone.

4. The method of claim 2, wherein at least one of the replacement request, the status request, and the status information are transmitted via a server.

5. The method of claim 1, further comprising:
   transmitting an arrival indication upon arriving at the target position,
   wherein radiating RF communications using the set RF communication parameters to begin taking over the communication services from the requesting communication drone upon arriving at the target position is performed after transmitting the arrival indication.

6. The method of claim 1, wherein the RF communication parameters distinguish the candidate communication drone from the requesting communication drone and the at least one communication drone neighboring the requesting communication drone by using a collision-free physical cell identity.

7. A method of offloading user equipment communication traffic between communications drones, comprising:
   transmitting, from a requesting communication drone, a status request to one or more candidate communication drones;
   receiving, at the requesting communication drone, one or more responses to the status request, wherein the received one or more responses include status information from responding candidate communication drones;
   determining radio frequency (RF) communication parameters for a replacement communication drone that is selected from the one or more candidate communication drones, wherein the determined RF communication parameters distinguish the replacement communication drone from the requesting communication drone and at least one communication drone neighboring the requesting communication drone; and
   transmitting, from the requesting communication drone, a replacement request to the replacement communication drone, wherein the determined RF communication parameters are included within the transmitted replacement request.

8. The method of claim 7, wherein at least one of the status request, the one or more responses to the status request, and the replacement request are transmitted via a server.

9. The method of claim 7, wherein status information received from the responding candidate communication drones and used to select the replacement communication drone includes one or more of an indication of a current communication state, battery status, available power level, flight time remaining, position, altitude, heading, speed, and current activities of the replacement communication drone.

10. The method of claim 7, further comprising:
    determining whether the replacement communication drone has arrived at a target position adjacent to the requesting communication drone; and
    performing a handover procedure to enable the replacement communication drone to take over handling the user equipment communication traffic from the requesting communication drone in response to determining that the replacement communication drone has arrived at the target position.

11. The method of claim 10,
wherein the handover procedure includes transmitting a handover message to the user equipment communicating with a network through the requesting communication drone, and
wherein the handover message forces the user equipment to start communicating with the network through the replacement communication drone.

12. The method of claim 10, wherein the handover procedure includes moving the requesting communication drone away from the replacement communication drone thereby decreasing signal strengths of communications from the requesting communication drone transmitted to the user equipment.

13. The method of claim 10, wherein the handover procedure includes decreasing signal strength of communications transmitted by the requesting communication drone to the user equipment.

14. The method of claim 7, further comprising:
selecting the replacement communication drone for replacement of the requesting communication drone from among the one or more candidate communication drones based on received responses to the status request.

15. A communication drone, comprising:
a transceiver; and
a processor coupled to the transceiver and configured with processor-executable instructions to:
 receive a replacement request from a requesting communication drone, wherein the replacement request includes identification information of the requesting communication drone;
 set radio frequency (RF) communication parameters for the communication drone to take over communications of the requesting communication drone, wherein the RF communication parameters are based on the replacement request and distinguish the communication drone from the requesting communication drone and at least one communication drone neighboring the requesting communication drone;
 move the communication drone toward a target position adjacent a position of the requesting communication drone without radiating RF communications on one or more frequencies used for user equipment communication traffic between a plurality of communications drones for taking over communication services of the requesting communication drone; and
 radiate RF communications on the one or more frequencies used for the user equipment communication traffic using the set RF communication parameters to begin taking over the communication services from the requesting communication drone upon arriving at the target position.

16. The communication drone of claim 15, wherein the processor is further configured with the processor-executable instructions to:
 receive a status request from the requesting communication drone; and
 transmit to the requesting communication drone status information in response to the status request.

17. The communication drone of claim 16, wherein the processor is further configured with the processor-executable instructions to transmit to the requesting communication drone status information that includes one or more of an indication of a current communication state, battery status, available power level, flight time remaining, position, altitude, heading, speed, and current activities of the communication drone.

18. The communication drone of claim 15, wherein the processor is further configured with the processor-executable instructions such that at least one of the replacement request, a status request, and the status information are transmitted via a server.

19. The communication drone of claim 15, wherein the processor is further configured with the processor-executable instructions to:
 transmit an arrival indication upon arriving at the target position; and
 radiate RF communications using the set RF communication parameters to begin taking over the communication services from the requesting communication drone upon arriving at the target position after transmitting the arrival indication.

20. The communication drone of claim 15, wherein the processor is further configured with the processor-executable instructions such that the RF communication parameters distinguish the communication drone from the requesting communication drone and the at least one communication drone neighboring the requesting communication drone by using a collision-free physical cell identity.

21. A communication drone, comprising:
a transceiver; and
a processor coupled to the transceiver and configured with processor-executable instructions to:
 transmit a status request to one or more candidate communication drones;
 receive one or more responses to the status request, wherein the received one or more responses include status information from responding candidate communication drones;
 determine radio frequency (RF) communication parameters for a replacement communication drone that is selected from the one or more candidate communication drones, wherein the determined RF communication parameters distinguish the replacement communication drone from the communication drone that transmitted the status request ("the requesting communication drone") and at least one communication drone neighboring the requesting communication drone; and
 transmit a replacement request to the replacement communication drone, wherein the determined RF communication parameters are included within the transmitted replacement request.

22. The communication drone of claim 21, wherein the processor is further configured with the processor-executable instructions such that at least one of the status request, the one or more responses to the status request, and the replacement request are transmitted via a server.

23. The communication drone of claim 21, wherein the processor is further configured with the processor-executable instructions such that status information received from the responding candidate communication drones and used to select the replacement communication drone includes one or more of an indication of a current communication state, battery status, available power level, flight time remaining, position, altitude, heading, speed, and current activities of the replacement communication drone.

24. The communication drone of claim 21, wherein the processor is further configured with the processor-executable instructions to:

determine whether the replacement communication drone has arrived at a target position adjacent to the communication drone; and perform a handover procedure to enable the replacement communication drone to take over handling user equipment communication traffic from the communication drone in response to determining that the replacement communication drone has arrived at the target position.

25. The communication drone of claim 24, wherein the processor is further configured with the processor-executable instructions to perform:

the handover procedure by transmitting a handover message to the user equipment is communicated with a network through the communication drone, and the handover message forces the user equipment to start communicating with the network through the replacement communication drone.

26. The communication drone of claim 24, wherein the processor is further configured with the processor-executable instructions to perform the handover procedure by moving the communication drone away from the replacement communication drone thereby decreasing signal strengths of communications from the communication drone transmitted to the user equipment.

27. The communication drone of claim 24, wherein the processor is further configured with the processor-executable instructions to perform the handover procedure by decreasing signal strength of communications transmitted by the communication drone to the user equipment.

28. The communication drone of claim 21, wherein the processor is further configured with the processor-executable instructions to:

select the replacement communication drone for replacement of the communication drone that transmitted the status request from among the one or more candidate communication drones based on received responses to the status request.

* * * * *